US012769164B2

(12) United States Patent
Harrison et al.

(10) Patent No.: US 12,769,164 B2
(45) Date of Patent: Oct. 20, 2026

(54) QUANTUM DOT LCD CIRCADIAN-FRIENDLY DISPLAY TECHNOLOGY

(71) Applicant: KORRUS, INC., Los Angeles, CA (US)

(72) Inventors: Benjamin Harrison, Los Angeles, CA (US); Paul Kenneth Pickard, Los Angeles, CA (US); William Coulter, Los Angeles, CA (US); Sina Afshari, Los Angeles, CA (US)

(73) Assignee: Korrus, Inc., Anaheim, CA (US)

( * ) Notice: Subject to any disclaimer, the term of this patent is extended or adjusted under 35 U.S.C. 154(b) by 0 days.

(21) Appl. No.: 18/673,106

(22) Filed: May 23, 2024

(65) Prior Publication Data

US 2025/0004324 A1 Jan. 2, 2025

Related U.S. Application Data

(60) Provisional application No. 63/468,371, filed on May 23, 2023.

(51) Int. Cl.

*G02F 1/00* (2006.01)
*G02F 1/1335* (2006.01)
*G02F 1/13357* (2006.01)

(52) U.S. Cl.

CPC .. *G02F 1/133603* (2013.01); *G02F 1/133614* (2021.01); *G02F 1/133621* (2013.01)

(58) Field of Classification Search

None
See application file for complete search history.

(56) References Cited

U.S. PATENT DOCUMENTS

| | | | | |
|---|---|---|---|---|
| 9,915,775 | B2 | 3/2018 | Krames | |
| 10,923,672 | B1 * | 2/2021 | Li | H10K 59/38 |
| 2012/0286304 | A1 * | 11/2012 | LeToquin | H10H 20/8513 257/E33.059 |
| 2015/0062892 | A1 * | 3/2015 | Krames | F21K 9/23 362/231 |
| 2016/0273717 | A1 * | 9/2016 | Krames | G02B 6/0073 |
| 2017/0368210 | A1 * | 12/2017 | David | A61L 2/0052 |
| 2019/0041699 | A1 * | 2/2019 | David | G02B 5/201 |
| 2022/0036793 | A1 * | 2/2022 | Petluri | G09G 3/32 |

* cited by examiner

*Primary Examiner* — Abdulmajeed Aziz
(74) *Attorney, Agent, or Firm* — FisherBroyles LLC

(57) ABSTRACT

A backlight for a display for emitting at least first and second emitted light, said backlight comprising a violet LED for emitting violet light, a cyan LED for emitting cyan light, red QDs (RQDs) for emitting red light, green QDs (GQDs) for emitting green light, a driver configured at least for driving said violet LED in a first mode, and driving said cyan LED in a second mode, wherein in said first mode, said violet LED is driven to emit said violet light, a portion of which is absorbed by said RQDs and said GQDs to emit said red light and green light respectively, said cyan LED is driven to emit said cyan light, a portion of which is absorbed by said RQDs and said SGQDs to emit said red light and short green light respectively.

20 Claims, 3 Drawing Sheets

QUANTUM DOT LCD CIRCADIAN-FRIENDLY DISPLAY TECHNOLOGY

CROSS-REFERENCE TO RELATED APPLICATION

This application claims the benefit of U.S. Provisional Application No. 63/468,371 filed May 23, 2023, the contents of which are incorporated by reference herein in their entirety as if fully set forth herein.

FIELD OF INVENTION

This disclosure relates to the field of circadian-friendly displays, and, more particularly, to a quantum dot (QD) display that has been designed to be circadian friendly.

BACKGROUND

Identification of non-visual photoreceptors in the human eye (so-called intrinsically photosensitive retinal ganglion cells, or "ipRGCs") linked to the circadian system has sparked considerable interest in the effects of various light spectra on health and amenity for human beings. High circadian stimulation may lead to positive effects such as resetting sleep patterns, boosting mood, increasing alertness and cognitive performance, and alleviating seasonal affective depression. However, mis-timed circadian stimulation can also be associated with disruption of the internal biological clock and melatonin suppression, and may be linked to illnesses such as cancer, heart disease, obesity, and diabetes.

Circadian stimulation is associated with glucocorticoid elevation and melatonin suppression and is most sensitive to light in the blue wavelength regime. With the preponderance of light-emitting diode (LED) illumination products being based on blue-primary phosphor-converted white-emitting LEDs, the situation has developed that most LED-based illumination sources have higher levels of circadian stimulation than the traditional sources they are intended to replace.

Of particular interest herein is the emission of the blue primary color, which has a peak emission around 460-485 nm.

Applicants have discovered that a spectrum can be configured to appear substantially white, despite a substantial absence of blue radiation, as described in U.S. Pat. No. 9,915,775. For simplicity, such spectra are referred to herein as blue-free. Blue-free emitters are desirable due to their reduced impact on the human circadian cycle, which is important for instance, in the evening before going to sleep.

There is an-ongoing need to provide displays (e.g., computer displays and televisions) with meaningful circadian-friendliness without sacrificing color quality. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

This invention disclosure is for a quantum dot (QD) LCD display technology that has been designed to be circadian friendly, optimizing visual comfort and health benefits for users by manipulating the emitted light spectrum based on the time of day. This invention integrates the use of a violet LED for a night safe, zero-blue light emission mode, and a cyan LED for a daytime safe, max-blue light emission mode. The system employs quantum dots to produce green and red light, with the potential for different quantum dots to be used for the day and night modes. Additionally, the LEDs used in the system can optionally be partly phosphor-converted.

Accordingly, in one embodiment, the present invention relates to a backlight for a display for emitting at least first and second emitted light, the backlight comprising: (a) a violet LED for emitting violet light; (b) a cyan LED for emitting cyan light; (c) red QDs (RQDs) for emitting red light; (d) green QDs (GQDs) for emitting green light. (e) a driver configured at least for driving the violet LED in a first mode, and driving the cyan LED in a second mode; wherein in the first mode, the violet LED is driven to emit the violet light, a portion of which is absorbed by the RQDs and the GQDs to emit the red light and green light respectively, wherein first emission comprises at least a portion of the violet light said, red light and the green light; and wherein in the second mode, the cyan LED is driven to emit the cyan light, a portion of which is absorbed by the RQDs and the SGQDs to emit the red light and short green light respectively, wherein second emission comprises at least a portion of the cyan light the red light and the green light.

In another embodiment, the present invention relates to a display for emitting at least first and second emitted light, the display comprising: (a) a violet LED for emitting violet light; (b) a cyan LED for emitting cyan light; (c) red QDs (RQDs) for emitting red light; (d) green QDs (GQDs) for emitting green light. (e) a driver configured at least for driving the violet LED in a first mode, and driving the cyan LED in a second mode; wherein in the first mode, the violet LED is driven to emit the violet light, a portion of which is absorbed by the RQDs and the GQDs to emit the red light and green light respectively, wherein first emission comprises at least a portion of the violet light said, red light and the green light; and wherein in the second mode, the cyan LED is driven to emit the cyan light, a portion of which is absorbed by the RQDs and the SGQDs to emit the red light and short green light respectively, wherein second emission comprises at least a portion of the cyan light the red light and the green light.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
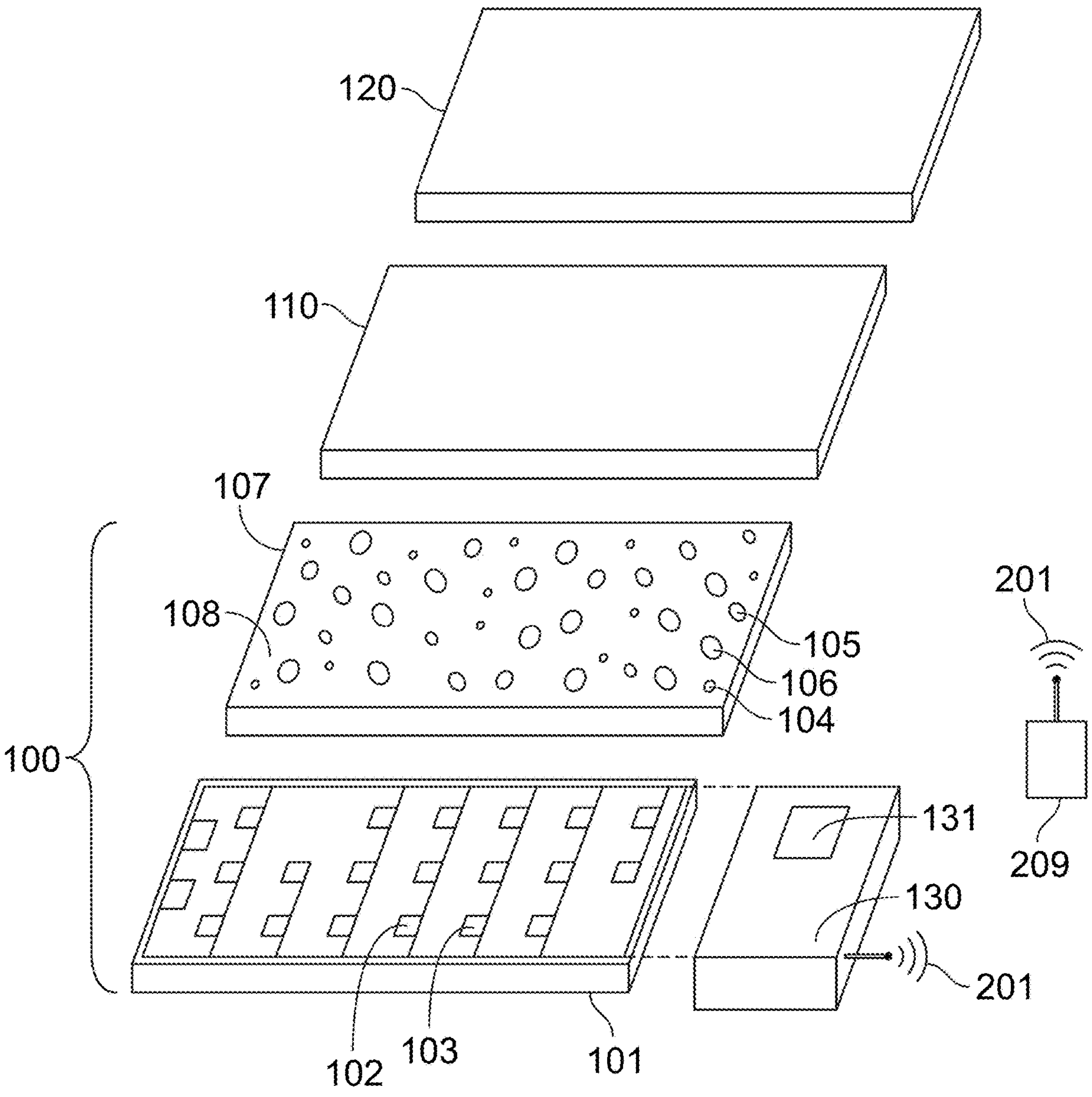
FIG. 1 shows an exploded schematic of one embodiment of the system of the present invention.

Referring to FIG. 1, an exploded view of one embodiment of a display 150 of the present invention is shown. The display 150 comprises a backlight 100 for emitting at least first and second emitted light. The backlight 100 comprises: (a) at least one violet LED 102 for emitting violet light; (b) at least one cyan LED 103 for emitting cyan light; (c) red QDs (RQDs) 104 for emitting red light; (d) green QDs (GQDs) 105 for emitting green light; and (e) a driver 130 configured at least for driving the violet LED in a first mode, and driving the cyan LED in a second mod. In the first mode, the violet LED is driven to emit the violet light, a portion of which is absorbed by the RQDs and the GQDs to emit the red light and green light respectively, wherein first emission comprises at least a portion of the violet light said, red light and the green light. In the second mode, the cyan LED is driven to emit the cyan light, a portion of which is absorbed by the RQDs and the SGQDs to emit the red light and short green light respectively, wherein second emission comprises at least a portion of the cyan light the red light and the green light. Each of these elements is described in greater detail below along with selected alternative embodiments.

Quantum dots (QDs) are tiny semiconductor particles only a few nanometers in size. They are so small that their optical and electronic properties differ from larger particles due to quantum mechanics. They can emit light of specific frequencies if electricity or light is applied to them. The specific frequency or color they emit is a direct consequence of their size; larger quantum dots emit light of longer wavelengths such as red, while smaller quantum dots emit light of shorter wavelengths such as green.

The unique property of quantum dots to tune their emission color just by changing their size makes them an ideal component in display technologies, bio-imaging, solar cells, and many other applications. By carefully choosing the size and composition of the quantum dots, it's possible to engineer a display that produces very specific colors, like the red and green colors discussed in your invention.

Applicant has identified several properties of Quantum dots (QDs) that make them ideal for use in display technologies:

Color Purity: The size of QDs can be precisely controlled during their synthesis, which directly determines their emission color due to quantum confinement effects. The size-dependent color tunability leads to highly pure and saturated colors, which can significantly improve the color gamut of displays.

Brightness and Efficiency: QDs are highly efficient light emitters. They can convert a high percentage of incoming light or electrical energy into emitted light, leading to brighter and more energy-efficient displays.

Durability: QDs are typically more resistant to heat and light exposure than traditional organic compounds used in displays, which can lead to longer-lasting displays.

Flexibility: QDs can be integrated into different parts of the display system. They can be used in color-conversion layers (quantum dot enhancement film, QDEF) for LED-backlit LCDs or as emissive layers in next-generation QD-LED displays.

Narrow Emission Bandwidth: Quantum dots have a narrow emission spectrum, meaning they emit a very specific color. This property helps to produce displays with a wider color gamut, providing more accurate and vivid color representation.

Non-Toxic Alternatives: While early QDs contained toxic elements like cadmium, recent advancements have led to the development of non-toxic QDs, which are safer for the environment and human health.

Together, these properties can allow for displays with exceptional color quality, brightness, energy efficiency, and lifespan.

Green-emitting quantum dots are typically smaller in size, usually in the range of 2-4 nanometers. The composition of green quantum dots can vary, but one common type is Cadmium Telluride (CdTe) quantum dots. These have been widely used due to their high quantum yield and stability. However, due to environmental concerns related to cadmium, non-cadmium green-emitting quantum dots, such as Indium Phosphide (InP) quantum dots, have been developed and are seeing increasing use.

Red-emitting quantum dots are larger in size, usually in the range of 4-6 nanometers. Similar to the green quantum dots, Cadmium Selenide (CdSe) quantum dots have been commonly used due to their high efficiency and stability. Again, due to the environmental and safety concerns related to cadmium, non-cadmium alternatives, like Copper Indium Selenide (CuInSe2) quantum dots, have been explored for their potential in emitting red light.

In one embodiment, the display uses a violet LED along with long green and red quantum dots (QDs) for nighttime use. The violet LED emits light at the violet end of the spectrum, which is less disruptive to the circadian rhythm than light at the blue end of the spectrum. Violet light is less likely to suppress melatonin production and therefore less likely to disrupt sleep patterns if the display is used at night.

Long Green Quantum Dots (LGQDs) are designed to convert the violet light from the LED into green light. Green light, particularly long-wavelength green light, is less impactful on the circadian rhythm than blue light.

Red Quantum Dots (RQDs) convert the violet light from the LED into red light. Red light has the least impact on the circadian rhythm of all the colors in the visible spectrum.

By using a violet LED along with long green and red QDs, the display minimizes the amount of blue light emitted during nighttime use. This can help to prevent the suppression of melatonin production and thereby reduce potential disruption to the user's sleep patterns and other potential negative health effects associated with nighttime exposure to blue light. It is a more circadian-friendly option for using displays in the evening or at night.

During the day, exposure to blue light is beneficial as it promotes alertness, improves mood, and helps maintain our sleep-wake cycle. In one embodiment, the display uses a cyan LED along with short green and red quantum dots (QDs) for daytime use. The cyan LED emits light in the cyan-blue spectrum. During the day, exposure to this kind of light can help maintain a healthy circadian rhythm by signaling to the body that it is daytime, which helps promote alertness and cognitive function.

Short Green Quantum Dots (SGQDs) convert the cyan light from the LED into shorter wavelength green light. This light has some effect on the circadian rhythm, but it's not as potent as blue light. The green light can help create a bright and vibrant display without significantly adding to the blue light exposure.

Red Quantum Dots (RQDs) convert some of the cyan light from the LED into red light. Red light has little to no impact on the circadian rhythm, but it's essential for achieving a full range of color on the display.

By using a cyan LED along with short green and red QDs during daytime use, this display provides the benefits of blue light, helping to maintain alertness and cognitive function, while still offering a full, vibrant range of colors. This setup allows for an optimal balance between circadian rhythm regulation and display performance during daytime hours.

A display system that uses a single quantum dot (QD) sheet with red and green QDs and two different LED backlights (cyan and violet) can be designed to switch between the LEDs based on the time of day. This design aims to optimize display performance while also considering the user's circadian rhythm.

Figure 2:
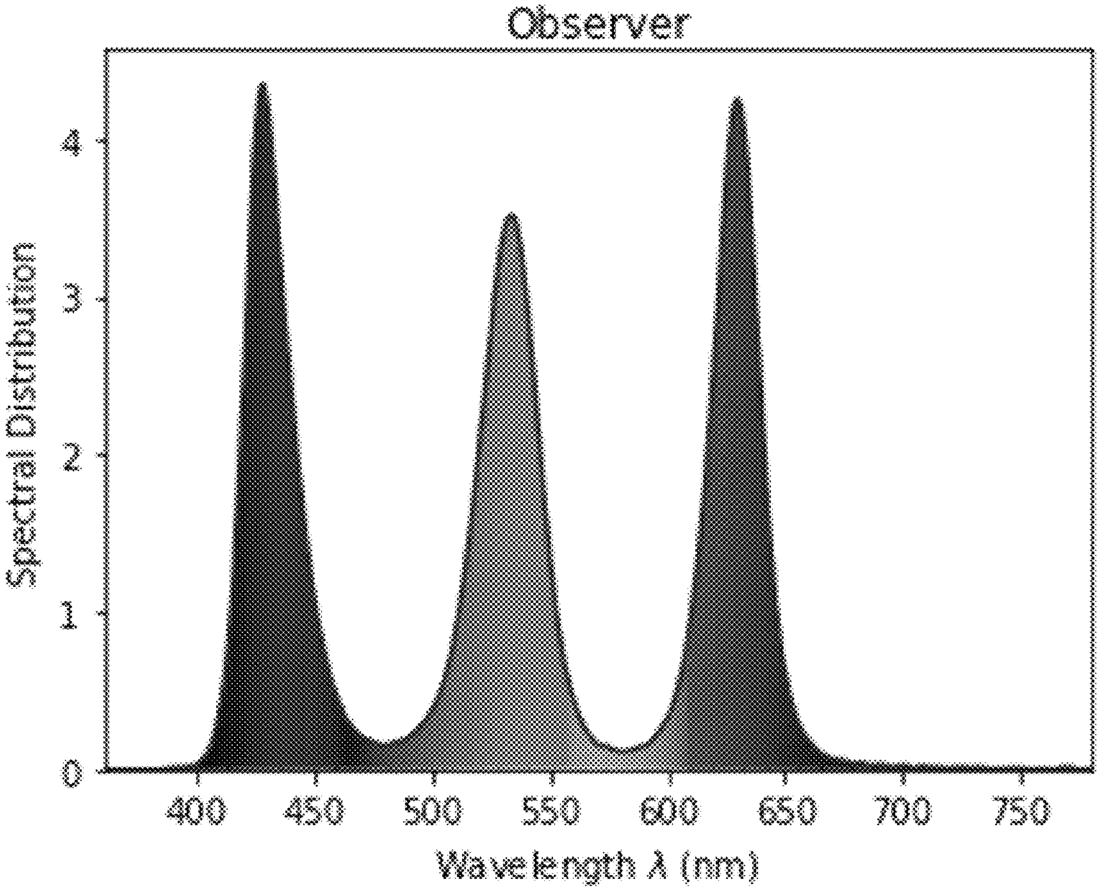
FIG. 2 shows one embodiment of a spectral power distribution (SPD) of the first light emission.

Referring to FIG. 2, a spectral power distribution (SPD) graph is shown for one embodiment of the first light emission. This SPD graph shows peak wavelengths at approximately 440 nm, 540 nm and 630 nm. Noteworthy is that there is very little power in the circadian stimulation range of 460-485 nm. Indeed, this range is a trough in FIG. 2. In one embodiment, the first emission has an overall SPD power and a blue SPD power between 460 and 485 nm, wherein the blue SPD power is less than 2% of the overall SPD power. In a more particular embodiment, the blue SPD power is less than 1% of the overall SPD power.

Figure 3:
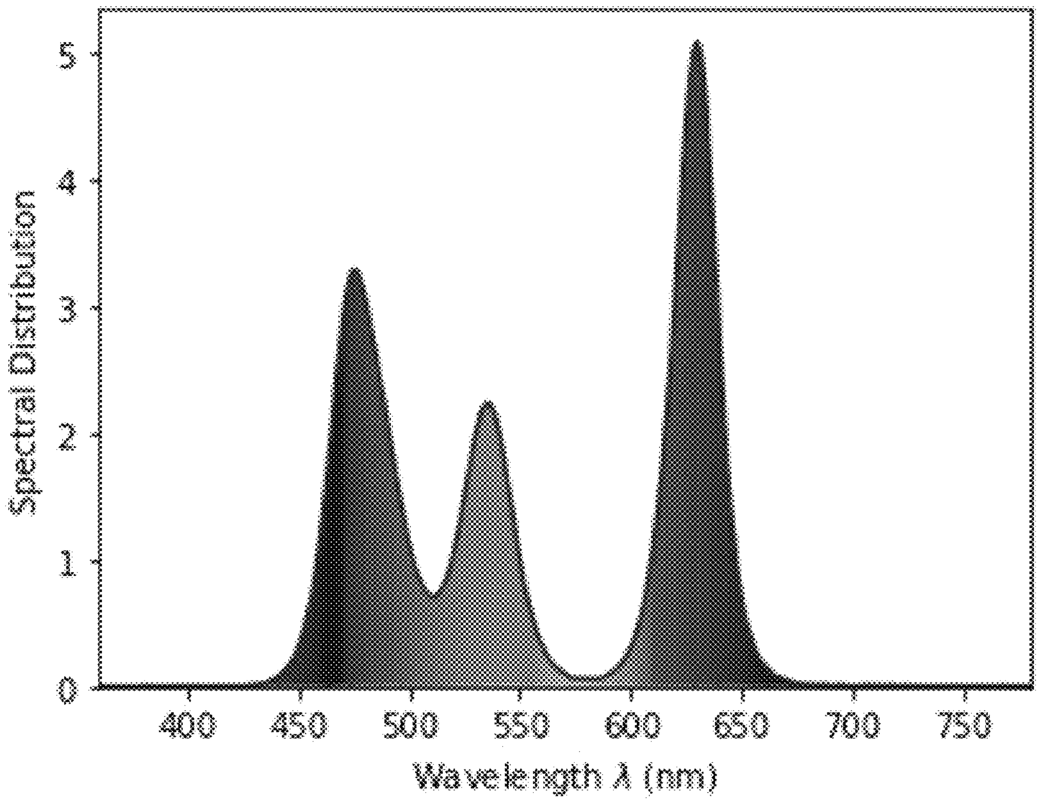
FIG. 3 shows one embodiment of an SPD of the second light emission.

Referring to FIG. 3, an SPD graph is shown for one embodiment of the second light emission. This SPD graph shows peak wavelengths 475 nm, 535 nm, and 630 nm. Noteworthy is that there is peak power in the circadian stimulation range of 460-485 nm. In one embodiment, the second emission has an overall SPD power and a blue SPD power between 460 nm and 485 nm, wherein the blue SPD power is more than 10% of the overall SPD power. In a more particular embodiment, the blue SPD power of the second emission is more than 20% of the overall SPD power.

The different SPD emission spectrums of the first and second light emissions have a significant effect on circadian stimulation. In one embodiment, the first emission has a first circadian stimulus (CS) less than half a second CS of the second emission. In a more particular embodiment, the first emission has a first CS less than ⅓ or even ¼ of a second CS of the second emission.

The specifics of the lighted emitters—i.e. the LEDs and quantum dots can be optimized by those of skill the art in light of the disclosure. That said, in one embodiment, the violet LED has a peak wavelength between 395 and 440 nm, the cyan LED has a peak wavelength between 470 and 520 nm, the RQDs have a peak wavelength between 600 and 65 nm, the LGQDs have a peak wavelength between 530 and 580 nm, and SGQDs have a peak wavelength between 500 and 540 nm.

In one embodiment, the LED and QDs are used as a backlight 100 for a display 150 is shown in FIG. 1. In one embodiment, the display system features two LED backlights, one violet LED 102 and one cyan LED 103. In this particular embodiment, multiple violet and cyan LEDs are disposed on a substrate 101 as shown in FIG. 1. As discussed above, the cyan LED backlight is designed for daytime use, while the violet LED backlight is designed for nighttime use.

In one embodiment, the quantum dots are disposed in QD sheet 107. For example, in one embodiment, the QD sheet 107 may contain red and long/short green quantum dots 104, 105, 106 dispersed within a transparent matrix 108 as shown in FIG. 1. These QDs are engineered to absorb and convert the light emitted by both the cyan and violet LEDs efficiently. In one embodiment, the LEDs are positioned on the substrate 101 to illuminate the QD sheet uniformly. In another embodiment the LGQDs and the SGQDs are situated over the violet LEDs and the cyan LEDs, respectively, to avoid the cross excitation of the LGQDs and SGQDs by either LED sources. In other words, the LGQDs would only be in the optical path of the violet LED light, while the SGQDs would only be in the optical path of the cyan LED light. One of ordinary skill in the art would be able to determine this configuration without undue experimentation in light of this disclosure.

In one embodiment, the display also comprises a liquid crystal display (LCD) panel 110. Specifically, the light from LED sources passes through the QD sheet such that a portion of the LEDlight is converted by the red and green QDs, and this combination of LED and converted light passes through the LCD panel 110. This panel modulates the intensity and color of the light to create the final image that is visible to the user. Those of skill in the art in light of this disclosure can readily design the LCD panel to work optimally with the QD sheet and the dual backlight system to maximize display performance under both lighting conditions.

In one embodiment, the display is protected by a screen 120 which is well known in the art.

In one embodiment, the driver 130 for powering the LEDs comprises a controller 131 that determines which LED backlight should be active based on the time of day. The controller can be configured in various embodiments. For example, it may be based on a real-time clock, ambient light sensor, or user-defined settings to decide when to switch between the cyan and violet LEDs.

Upon receiving the signal from the controller, the display system changes its backlight source. If the controller determines that the user is in their daytime phase, the cyan LED backlight is activated. If the controller determines the user is in their nighttime phase, the violet LED backlight is activated. This way, the display adapts to the user's circadian rhythm, promoting better sleep health and overall well-being.

The user can provide feedback or manually override the automatic settings if necessary. This feedback can be incorporated into the data analysis to improve the accuracy of the body clock time prediction and the appropriateness of the display settings.

When switching between the first and second modes, the driver may either gradually or instantly switch between the cyan and violet backlights, depending on the desired implementation.

In one embodiment, the driver is configured to operate in a third mode in which both said violet and said cyan LEDs are powered. In another embodiment, the driver is configured to operate in just the first, second, or third mode.

By implementing this design, the display can provide a rich, vibrant range of colors while also considering the user's circadian rhythm. The cyan LED backlight for daytime use supports alertness and cognitive function, while the violet LED backlight for nighttime use minimizes melatonin suppression, reducing potential sleep disruption and other negative health effects associated with nighttime blue light exposure.

Furthermore, integrating the system with an external controller 200 that tracks the body clock time (also known as the circadian rhythm) of a user can provide a personalized and more effective way to manage the display settings. For example, in one embodiment, the external controller is a wearable device like a smartwatch or fitness tracker, or even a smartphone application, which tracks the user's circadian rhythm. This could be achieved by collecting and analyzing data like sleep patterns, activity levels, heart rate variability, light exposure, and other relevant health metrics.

In one embodiment, either the controller or the external controller (or both) uses machine learning algorithms or other data analysis techniques to determine the user's current body clock time. For example, it might infer that the user is in their "daytime" phase if they have been active and exposed to bright light, while it might infer that they are in their "nighttime" phase if they have been inactive and in dim light.

In one embodiment, the controller communicates with the display system via a wireless signal 201 like Bluetooth, WiFi or NFC.

Such a system provides a personalized display experience that respects and aligns with the user's circadian rhythm. Not only does this improve the visual comfort of the display, but also it contributes to better sleep health and overall well-being for the user.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein and are intended to be within the spirit and scope of the invention. Accordingly, the foregoing description is by way of example only, and not limiting. The invention is limited only as defined in the following claims and equivalents thereto.

What is claimed is:

1. A backlight for a display for emitting at least first and second emitted light, said backlight comprising:
- a violet LED for emitting violet light;
- a cyan LED for emitting cyan light;
- red QDs (RQDs) for emitting red light;
- green QDs (GQDs) for emitting green light, said GQDs comprising long Green QDs (LGQDs) for emitting long green light and short Green QDs (SGQDs) for emitting short green light;
- a driver configured at least for operating said backlight in a first mode and a second mode, said driver being configured for driving said violet LED in said first mode and driving said cyan LED in said second mode;
- wherein in said first mode, said violet LED is driven to emit said violet light, a portion of which is absorbed by said RQDs and said LGQDs to emit said red light and said long green light, respectively, wherein first emission comprises at least a portion of said violet light, said red light, and said long green light, and wherein said cyan LED is driven insubstantially relative to said violet LED such that said first emission has an overall SPD power and a blue SPD power between 460 and 485 nm, wherein said blue SPD power is less than 2% of said overall SPD power; and
- wherein in said second mode, said cyan LED is driven to emit said cyan light, a portion of which is absorbed by said RQDs and said SGQDs to emit said red light and said short green light, respectively, wherein second emission comprises at least a portion of said cyan light, said red light, and said short green light, and wherein said violet LED is driven insubstantially relative to said cyan LED such that said second emission has an overall SPD power and a blue SPD power between 460 nm and 485 nm, wherein said blue SPD power is more than 10% of said overall SPD power.

2. The backlight of claim 1, wherein said
- LGQDs are positioned in an optical path of said violet light, and said SGQDs are positioned in an optical path of said cyan light.

3. The backlight of claim 1, wherein said first emission has a first circadian stimulus (CS) less than half a second CS of said second emission.

4. The backlight of claim 1, wherein said first emission has a first CS less than ⅓ or ¼ of a second CS of said second emission.

5. The backlight of claim 1, wherein said blue SPD power of said first emission is less than 1% of said overall SPD power.

6. The backlight of claim 1, wherein said blue SPD power of said second emission is more than 20% of said overall SPD power.

7. The backlight of claim 1, wherein said violet LED has a peak wavelength between 395 and 440 nm.

8. The backlight of claim 1, wherein said cyan LED has a peak wavelength between 470 and 520 nm.

9. The backlight of claim 1, wherein said RQDs have a peak wavelength between 600 and 640 nm.

10. The backlight of claim 2, wherein said LGQDs have a peak wavelength between 530 and 580 nm.

11. The backlight of claim 2, wherein said SGQDs have a peak wavelength between 500 and 540 nm.

12. The backlight of claim 1, further comprising at least one QD Sheet comprising said RQDs, LGQDs, and SGQDs dispersed within a transparent matrix.

13. The backlight of claim 1, wherein said driver comprises a control module for selecting between said first and second modes based on at least one of a real-time clock, ambient light sensor, user-defined setting, wireless signal, or a wearable device.

14. The backlight of claim 13, wherein said driver uses data analysis techniques to determine the user's current body clock time.

15. The backlight of claim 1, wherein said driver is configured to operate in a third mode in which both said violet and said cyan LEDs are powered.

16. A display comprising said backlight of claim 1.

17. The display of claim 16, further comprising:
- an LCD panel in front of said backlight.

18. A display for emitting at least first and second emitted light, said display comprising:
- a violet LED for emitting violet light;
- a cyan LED for emitting cyan light;
- red QDs (RQDs) for emitting red light;
- green QDs (GQDs) for emitting green light-, said GQDs comprising long Green QDs (LGQDs) for emitting long green light and short Green QDs (SGQDs) for emitting short green light;
- a driver configured at least for operating said display in a first mode and a second mode, said driver being configured for driving said violet LED in said first mode and driving said cyan LED in said second mode;
- wherein in said first mode, said violet LED is driven to emit said violet light, a portion of which is absorbed by said RQDs and said LGQDs to emit said red light and said long green light, respectively, wherein first emission comprises at least a portion of said violet light, said red light, and said long green light, and wherein said cyan LED is driven insubstantially relative to said violet LED such that said first emission has an overall SPD power and a blue SPD power between 460 and 485 nm, wherein said blue SPD power is less than 2% of said overall SPD power; and
- wherein in said second mode, said cyan LED is driven to emit said cyan light, a portion of which is absorbed by said RQDs and said SGQDs to emit said red light and said short green light, respectively, wherein second emission comprises at least a portion of said cyan light, said red light, and said short green light, and wherein said violet LED is driven insubstantially relative to said cyan LED such that said second emission has an overall SPD power and a blue SPD power between 460 nm and 485 nm, wherein said blue SPD power is more than 10% of said overall SPD power.

19. The backlight of claim 1, wherein said cyan LED is not driven in said first mode and said violet LED is not driven in said second mode.

20. The display of claim 18, wherein said cyan LED is not driven in said first mode and said violet LED is not driven in said second mode.

* * * * *